(12) United States Patent
Thiele et al.

(10) Patent No.: US 12,090,853 B2
(45) Date of Patent: Sep. 17, 2024

(54) OPERATING DEVICE FOR A MOTOR VEHICLE AND MOTOR VEHICLE WITH AN OPERATING DEVICE

(71) Applicant: Volkswagen Aktiengesellschaft, Wolfsburg (DE)

(72) Inventors: Henning Thiele, Wolfsburg (DE); Wojciech Huwer, Braunschweig (DE); Anette Grüneberg, Hannover (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 18/264,361

(22) PCT Filed: Jan. 18, 2022

(86) PCT No.: PCT/EP2022/050941
§ 371 (c)(1),
(2) Date: Aug. 4, 2023

(87) PCT Pub. No.: WO2022/171388
PCT Pub. Date: Aug. 18, 2022

(65) Prior Publication Data
US 2024/0042859 A1   Feb. 8, 2024

(30) Foreign Application Priority Data
Feb. 9, 2021 (DE) .......................... 102021201185.3

(51) Int. Cl.
*B60K 35/10* (2024.01)
*B60K 35/21* (2024.01)
(Continued)

(52) U.S. Cl.
CPC ............ *B60K 35/10* (2024.01); *B60K 35/212* (2024.01); *G06F 3/0362* (2013.01);
(Continued)

(58) Field of Classification Search
CPC ...... B60K 35/10; B60K 35/212; B60K 35/81; B60K 2360/126; B60K 2360/1438;
(Continued)

(56) References Cited

U.S. PATENT DOCUMENTS 6,348,772 B1   2/2002   May
10,157,709 B2  12/2018  Lyszus et al.
(Continued)

FOREIGN PATENT DOCUMENTS

DE    19857837 A1    6/2000
DE    102004035960 A1    3/2006
(Continued)

OTHER PUBLICATIONS

PCT/EP2022/050941. International Search Report (Oct. 20, 2022).

*Primary Examiner* — Xuemei Zheng
(74) *Attorney, Agent, or Firm* — Peter Zura; LOZA & LOZA, LLP

(57) ABSTRACT

An operating device for a motor vehicle, having a base element configured to be attached to an interior component, a screen device configured to display a driving mode and/or an ambient mode of the motor vehicle display, having a touch-sensitive surface configured to receive a first user input. A ring element is configured to enclose the screen device on the peripheral side, and configured to move relative to the base element in different rotational positions, and configured to receive a second user input via an adjustment of the ring element between the rotational positions, and a control device which is configured to, depending on the first user input and/or the second user input, provide a control signal to trigger a driving mode to be set and/or an ambient mode of the motor vehicle to be set.

20 Claims, 2 Drawing Sheets

(51) Int. Cl.
*G06F 3/0362* (2013.01)
*G06F 3/041* (2006.01)
*B60K 35/00* (2006.01)

(52) U.S. Cl.
CPC ............ *G06F 3/0416* (2013.01); *B60K 35/00* (2013.01); *B60K 2360/126* (2024.01); *B60K 2360/143* (2024.01); *B60K 2360/345* (2024.01)

(58) Field of Classification Search
CPC .. B60K 2360/115; B60K 35/00; B60K 35/22; B60K 35/20; B60K 2360/143; G06F 3/0362; G06F 3/016; G06F 3/0482; G06F 3/04847; G06F 3/0488
See application file for complete search history.

(56) References Cited

U.S. PATENT DOCUMENTS

| | | | | |
|---|---|---|---|---|
| 2011/0205164 | A1* | 8/2011 | Hansen | G06F 3/0416 |
| | | | | 345/173 |
| 2016/0144716 | A1* | 5/2016 | Kim | G06F 3/0362 |
| | | | | 345/184 |
| 2017/0140757 | A1 | 5/2017 | Penilla et al. | |
| 2019/0077261 | A1* | 3/2019 | Choi | B60H 1/0065 |
| 2022/0118853 | A1* | 4/2022 | Chung | G05G 1/025 |

FOREIGN PATENT DOCUMENTS

| | | | | |
|---|---|---|---|---|
| DE | 102005049513 | A1 | | 5/2006 |
| DE | 102007035564 | A1 | | 1/2009 |
| DE | 102011114051 | A1 | | 3/2013 |
| DE | 102005004202 | B4 * | 7/2013 | ............ B60K 35/00 |
| DE | 102013008567 | A1 | | 11/2014 |
| DE | 102015115044 | A1 * | 3/2017 | |
| DE | 102016219122 | A1 | | 4/2018 |
| DE | 102018113140 | A1 | | 12/2019 |
| DE | 102018212298 | A1 | | 1/2020 |
| DE | 102019208443 | A1 | | 12/2020 |
| GB | 2494420 | A | | 3/2013 |
| WO | WO-2022200076 | A1 * | 9/2022 | ............ B60K 20/06 |

* cited by examiner

//  OPERATING DEVICE FOR A MOTOR VEHICLE AND MOTOR VEHICLE WITH AN OPERATING DEVICE

RELATED APPLICATIONS

The present application claims priority to International Patent Application No. PCT/EP2022/050941 to Thiele, et al., titled "Operating Method For An Operating Device For A Motor Vehicle And A Motor Vehicle With An Operating Device", filed Jan. 18, 2022, which claims priority to German Patent App. No. DE 10 2021 201 185.3, filed Feb. 9, 2021, the contents of each being incorporated by reference in their entirety herein.

FIELD OF TECHNOLOGY

The present disclosure relates to an operating device for a motor vehicle and a motor vehicle with an operating device.

BACKGROUND

GB 2494420 A discloses a multifunction rotary controller for controlling a system that supplies control signals to the system based on the actuation of a manually operable rotating means and a switch. The multifunction rotary controller includes a display that displays information about a variety of operating modes of the system in a circular area of the multifunction rotary controller. The switch can be a mechanical switch and can be operated by pressing a button, in particular the rotating means, the display, or a window element through which the display can be viewed. The display may comprise a touch screen and be located within a circular area enclosed by the rotating means. Respective operating modes for control functions can be selected and controlled using the switch and the rotating means in combination. The multifunction rotary controller can be set up to control an air conditioning system, including functions of ventilation, air temperature, and seat heating or seat cooling temperature in a motor vehicle.

Furthermore, an operator interface unit for a vehicle is known from DE 10 2005 049 513 A1, which comprises at least one user control element for an operator setting and a field change sensor configured to detect an object in the vicinity of the at least one user control element. Furthermore, the operator interface unit includes a control unit in electrical communication with the field change sensor and the at least one user control element, and an electronic display unit in electrical communication with the control unit configured to control the electronic display unit based on the field change sensor. The at least one user control element is a ring button and the electronic display unit is integrated into a body of the ring button. The electronic display unit here is a circular electronic display unit, and a plurality of keys are arranged on the periphery and around the electronic display unit. The operator interface unit thus comprises the large ring button with the integrated display unit in the center of the ring button and is set up for multi-function operation.

Furthermore, DE 10 2007 035 564 A1 discloses an operating device for operating a large number of functions in a vehicle, with a multi-dial operating element. This multi-dial operating element comprises a plurality of rotary actuators arranged coaxially in a common rotary axis so that they can be rotated. These rotary actuators are assigned to different functions of the vehicle. Each rotary actuator can have a rotary body that is located on the radial inside and can be actuated by rotating and a non-rotatable ring-shaped display body that is located on the radial outside to visually display operating information assigned to the respective rotary body. Here, the ring-shaped display body encloses the associated rotary body coaxially.

SUMMARY

Aspects of the present disclosure are directed to technologies and techniques for controlling a particularly large number of vehicle functions of a motor vehicle via a particularly small number of user inputs using a particularly small number of operating elements.

In some examples, an operating device for a motor vehicle is disclosed, including the features of the independent claims. Further aspects are disclosed in the features recited in the dependent claims, the description, and figures.

In some examples, an operating device for a motor vehicle is disclosed, including a base element designed to be attached to an interior component of the motor vehicle. Furthermore, the operating device includes a screen device configured to display a driving mode of the motor vehicle. In this case, the screen device is configured in particular to output a light signal that characterizes the driving mode, as a result of which the driving mode of the motor vehicle can be displayed visually via the screen device. The screen device also has a touch-sensitive surface that is configured to receive a first user input. In this case, the first user input may correspond in particular to a touch of the touch-sensitive surface. The screen device may also be configured to provide the first user input received for a control device of the operating device. The operating device may also include a ring element arranged so that it encloses the screen device on the peripheral side. The ring element may be configured to have different rotational positions relative to the base element. The ring element can be adjusted between the respective different rotational positions by rotating it about an axis of rotation. Furthermore, the ring element may be configured to receive a second user input characterized by an adjustment of the ring element between the rotary positions. This second user input can provide the ring element for the controller. The ring element may enclose the screen device fully radially outward at least in a longitudinal area along the axis of rotation. The screen device is thus arranged at least in regions within a volume enclosed radially outwards by the ring element. The screen device may protrude past the ring element in the axial direction of the ring element, be behind the ring element, or end flush with the ring element.

In some examples, a motor vehicle is disclosed including an operating device described herein. In this case, the operating device may be configured as an interior component of the motor vehicle in the interior of the motor vehicle. In some examples, the operating device can be positioned on a center console or on a dashboard of the motor vehicle. Advantages and developments of the operating device according to the invention are to be regarded as advantages and developments of the motor vehicle according to the invention and vice-versa.

BRIEF DESCRIPTION OF THE DRAWINGS

Aspects of the present disclosure may be derived from the following description of the figures and from the drawing. The features and feature combinations mentioned herein can be used not only in the combination specified in each case, but in other combinations or on their own as well, without going outside the scope of the present disclosure.

DETAILED DESCRIPTION

Figure 1:
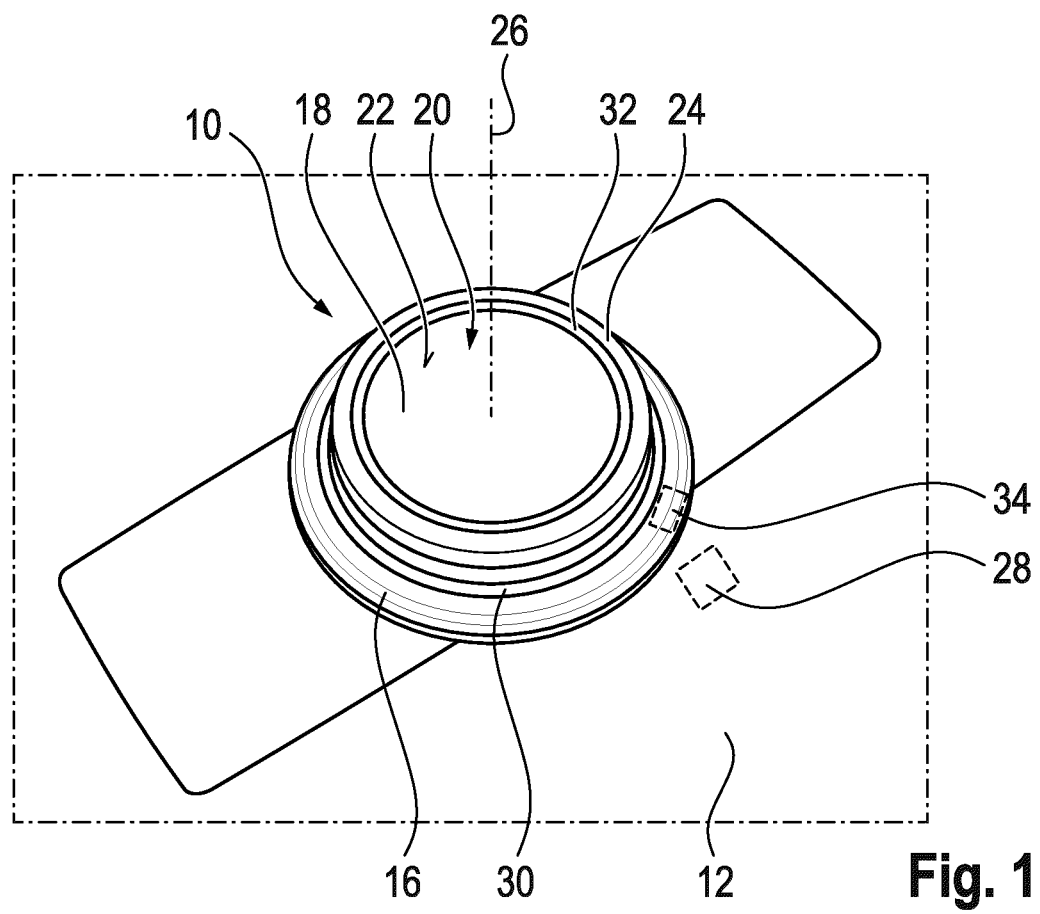
FIG. 1 shows a diagram in perspective view of an operating device for a motor vehicle, held on an interior component of the motor vehicle via a base element and which has a screen device that is laterally surrounded by a ring element arranged in different rotational positions, and by means of which a driving mode and/or an ambient mode of the motor vehicle can be displayed, wherein the driving mode to be set in the motor vehicle and/or the ambient mode to be set in the motor vehicle can be selected by means of the operating device, according to some aspects of the present disclosure.

Elements that are the same or have the same function are provided with the same reference symbols in the figures.

In some examples disclosed herein, the operating device may also include the control device, which is configured to provide a control signal that characterizes a driving mode to be set and/or an ambient mode of the motor vehicle to be set, depending on the first user input and/or the second user input. The control device may thus be set up to receive the first user input from the screen device and the second user input from the ring element and to determine the driving mode to be set and/or the ambient mode to be set depending on the first user input and/or the second user input. The control device for an electronic computing device of the motor vehicle can provide the control signal characterizing this determined driving mode and/or the ambient mode to be set, which is set up to set the driving mode, characterized by the control signal or the ambient mode characterized by the control signal in the motor vehicle.

The computing device of the motor vehicle can be used to trigger the output of the selected and/or set ambient mode and/or the selected and/or set driving mode via a display device, such as another screen device. The additional screen device may be configured as a display in the interior of the motor vehicle. The display may be part of a so-called infotainment device. Depending on the first user input and/or the second user input, the control device can be used to trigger the setting of the driving mode or ambient mode to be set that is characterized by the user input. In other words, a person can make the respective user input by actuating the touch-sensitive surface and/or by rotating the ring element about the axis of rotation, via which a driving mode can be selected from a number of predefined driving modes in a menu or an ambient mode can be selected from a number of predefined ambient modes in a menu.

This driving mode selected via the menu characterizes the driving mode to be set in the motor vehicle. The selected ambient mode can characterize a number of settings of the motor vehicle, such as different vehicle components of the motor vehicle. In this case, the set ambient mode can characterize ventilation and/or temperature control and/or volume of a media played in the interior of the motor vehicle and/or lighting of the vehicle interior. By selecting the ambient mode to be set, the settings for the different vehicle components of the motor vehicle can thus be set easily with very few user inputs. The operating device thus enables particularly simple and convenient selection of the driving mode or the ambient mode for the motor vehicle.

In some examples, the control device is also configured to trigger the display of the driving mode using the screen device. This means that the control device controls the screen device and in particular controls the display of the driving mode by the screen device. The operating device thus makes it possible for a vehicle occupant to recognize the driving mode in a particularly simple manner by means of the first light signal, which is output by the display device and characterizes the driving mode. Furthermore, the operating device is configured to provide the control signal that characterizes the driving mode selected to be set via the operating device, as a result of which the setting of the driving mode can be controlled particularly easily by a person via the operating device.

In some examples, the control device may be configured to trigger a display of the set driving mode or a driving mode selected for setting depending on the first user input and/or the second user input via the screen device. This means that the driving mode already set in the motor vehicle or the driving mode to be set that is selected as a function of the first user input and/or the second user input is displayed by means of the display device. Consequently, the operating device enables the person to see particularly easily and particularly well via the screen device which driving mode is set in the motor vehicle or which driving mode to be set in the motor vehicle has been selected using the operating device. For example, it can be provided that the control device is configured to receive a driving mode signal, in particular from the electronic computing device of the motor vehicle, the driving mode signal characterizing the driving mode set in the motor vehicle. The control device can also be configured to trigger the display of the driving mode, which is characterized by the driving mode signal and is set in the motor vehicle, on the screen device. In order to make it particularly easy for a vehicle occupant to recognize the driving mode displayed via the screen device and/or to enable the vehicle occupant to draw their attention to the driving mode displayed via the screen device, the control device can be configured to trigger the output of a moving image that characterizes the driving mode via the screen device. The control device can thus be configured to control the screen device in such a way that it outputs an animated image that characterizes the driving mode. As a result, the driving mode displayed via the screen device can be recognized particularly well by the vehicle occupant.

In some examples, the control device may be configured to trigger a display of the ambient mode set and/or display of an ambient mode selected for setting via the screen device. In this case, the ambient mode selected for the setting can be selected based on the first user input and/or the second user input. To determine the set ambient mode, the control device can be configured to receive an ambient mode signal from the electronic computing device that characterizes the set ambient mode. The control device can be used to control the screen device in such a way that it displays the driving mode that is set or that is to be set and/or the ambient mode that is set or that is to be set. In this case, the screen device can be configured to display the driving mode that is set or selected for setting together and thus simultaneously with the set ambient mode or the ambient mode selected for setting. Due to the display of the selected or set ambient mode, the set or selected ambient mode can be recognized particularly easily by a vehicle occupant by means of the screen device.

In some examples, the operating device may include a proximity sensor that is configured to receive a third user input characterized by an approach to the proximity sensor. Furthermore, the control device can be configured to switch the screen device to a standby mode when the third user input is received. The proximity sensor can thus be configured to determine the approach of an object and/or a vehicle occupant of the motor vehicle to the operating device and to provide a proximity signal characterizing the approach detected for the control device. Based on the proximity signal received, the control device can determine whether the proximity detected characterizes the third user input. In this case, the control device can be configured to switch the screen device to the standby mode if it has been determined that the approach corresponds to the third user input. The proximity sensor thus enables the screen device to be woken up as a consequence of the approach of the object and/or of the vehicle occupant to the proximity sensor, and thus put into the standby mode. In particular, the proximity sensor is configured to detect an actuation of the operating device by the third user input, in particular before there is direct contact between the vehicle occupant and the operating device. As a result, if the standby mode is not set in the display device, the display device can be operated in an energy-saving mode in which the energy consumption of the display device is reduced compared to the standby mode. The proximity sensor thus enables the operating device to be operated in a particularly energy-efficient manner.

In another example, a locking device is provided that is set up to mechanically or electromagnetically hold the ring element in the respective rotary positions. This means that the ring element can be locked in the respective rotational positions with a respective holding force by means of the locking device. By overcoming the respective holding force, the ring element can be rotated manually between the respective rotational positions by a single person. The locking device makes it possible for a person to keep the risk of an unintentional adjustment of the ring element particularly low.

In this case, the ring element may be configured to be locked in respective rotational positions offset by 30 degrees from one another. This means that twelve different rotational positions can be specified for the ring element in which the ring element can be arranged in each case. By locking the ring element in the respective rotary positions with the holding force, a person operating the ring element can receive haptic feedback communicating the number of rotary positions through which the ring element passes when the ring element is adjusted. In particular, each of the predetermined rotary positions can be characterized by a different second user input, whereby the person can make a selection in a menu by setting the ring element to a respective rotary position; in particular, a driving mode can be selected from a large number of stored driving modes or an ambient mode can be selected from a large number of ambient modes. The provision of the twelve predetermined rotary positions makes it possible for a person operating the ring element to perceive the different rotary positions as being particularly well differentiated from one another.

In some examples, a ring light element may be provided that is configured to emit a light signal enclosing the ring element. In this case, this additional second light signal can characterize the set driving mode and/or the set ambient mode. The ring light element can be held in particular on the base element of the operating device. Here it can be provided in particular that the ring light element is fixed relative to the base element. As an alternative to positioning the ring light element on the base element, the ring light element can be positioned on the ring element in a fixed position. In this case, the ring light element can be rotated about the axis of rotation together with the ring element relative to the base element. The ring light element can be integrated, for example, into a lateral surface of the ring element. In particular, the additional second light signal that can be emitted by means of the ring light element frames the ring element. As a result, the person can see the ring element particularly well, which means that the person can operate the ring element particularly easily. The ring light element can be configured to output the second light signal with a color contained in the display and output via the screen device, in particular in the same colors as those on the display provided by the screen device. The light ring element thus makes it possible for vehicle occupants of the motor vehicle to recognize the driving mode and/or the ambient mode in a particularly simple manner. Furthermore, the ring light element enables the ring element to be operated particularly safely and easily in dark lighting conditions in the interior of the motor vehicle, as the second light signal allows the vehicle occupants to see a position of the operating device particularly well.

In another example, the screen device may be radially surrounded by an aluminum ring fixed to the screen device, the aluminum ring in turn being radially surrounded by the ring element. In this case, the ring element and the aluminum ring can be arranged concentrically to one another, with the respective center axes of the aluminum ring and of the ring element able to lie on the axis of rotation of the ring element. The screen device is thus clearly visually delimited from the ring element by the aluminum ring, as a result of which the screen device or respective edges of the screen device can be recognized particularly well by an occupant of the motor vehicle. As a result, the vehicle occupant can operate the screen device in a particularly safe manner and the risk of reaching to the screen device and failing to do so can be kept particularly low. Furthermore, the aluminum ring can allow the ring element to slide particularly well, as a result of which the ring element can be adjusted between the rotational positions in a particularly simple manner.

In another example, the screen device and/or the ring element may be configured to be axially displaceable relative to the base element for actuation. This means that the screen device and/or the ring element can be pressed in the axial direction relative to the base element. A confirmation of a selection made by the first user input and/or the second user input can be characterized by the pressing of the screen device and/or the ring element relative to the base element. The base element can be fixed relative to the interior component, in particular when it is fastened to the interior component. In order to enable vehicle occupants of the motor vehicle to see a display output via the screen device particularly well, it can be provided that the screen device is fixed in its orientation about the axis of rotation of the ring element relative to the base element. The ring element can be held on the base element so that it can rotate about the axis of rotation relative to the base element. The fact that the screen device and/or the ring element can be displaced axially relative to the base element makes it possible to provide vehicle occupants with a particularly large number of different input options via the operating device, using a particularly small number of components of the operating device.

Turning to FIG. 1, the drawing shows an operating device 10, which is integrated into an interior component 12 of a motor vehicle, in the present case a car, in particular a passenger car. This means that the operating device 10 is positioned in the interior component 12 to fill a recess in the interior component 12. The operating device 10 enables an occupant of the motor vehicle to control at least one component of the motor vehicle.

Figure 2:
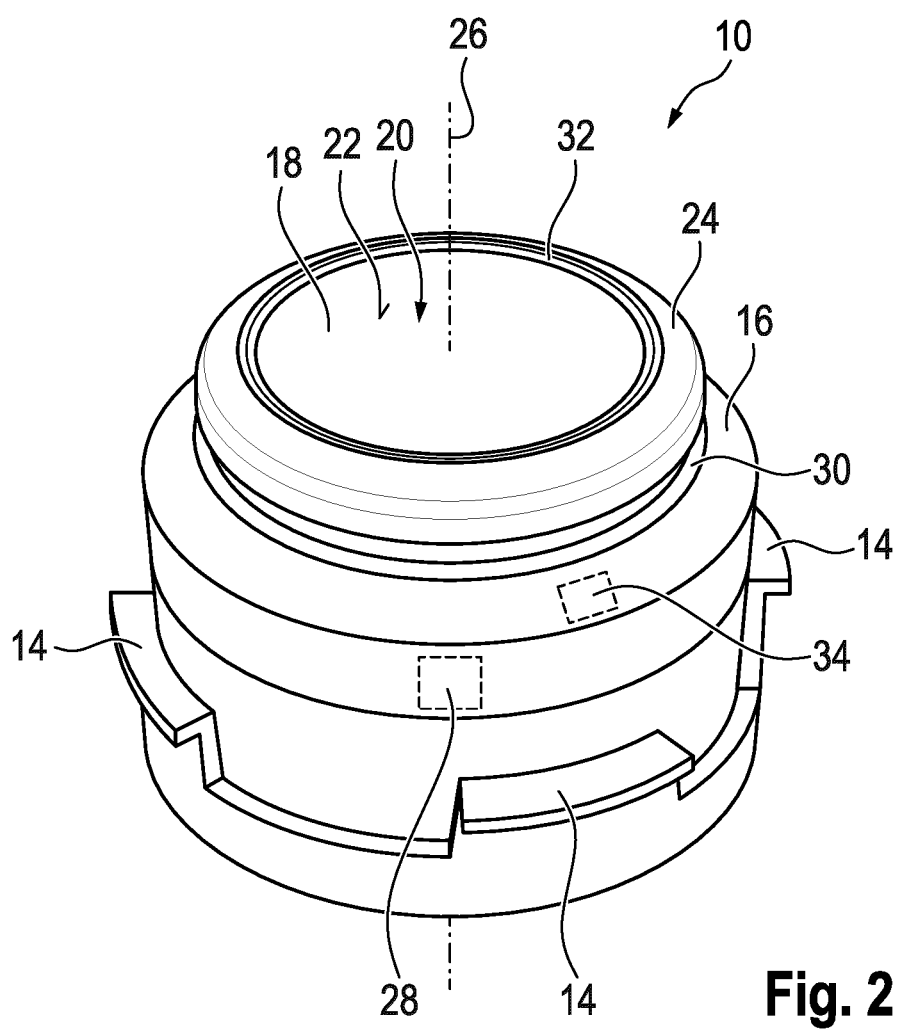
FIG. 2 shows a diagram in perspective view of the operating device according to FIG. 1, with the screen device including a touch-sensitive surface via which the first user input and/or the second user input can be received, a driving mode to be set in the motor vehicle and/or an ambient mode to be set in the motor vehicle can be determined and made available for an electronic computing device in the motor vehicle, by means of which the determined driving mode and/or the determined ambient mode can be set in the motor vehicle, according to some aspects of the present disclosure.

As can be seen in FIG. 2, the operating device 10 can have at least one, or several, mounting arms 14, via which the operating device 10 can be held on the interior component 12. As can also be seen in the figures, the operating device 10 comprises a base element 16, via which the operating device 10 can be fastened to the interior component 12. Furthermore, the operating device 10 comprises a screen device 18, the display area 20 of which is circular in the present case. The screen device 18 can display a driving mode and/or an ambient mode via the display area 20. In this case, the screen device 18 can be set up to output a first light signal that characterizes the driving mode and/or the ambient mode. Here, the driving mode and/or the ambient mode can be displayed via a color and/or a shape of the first light signal and in particular via lettering corresponding to the first light signal and/or a pictogram corresponding to the first light signal. In this case, a driving mode and/or ambient mode that is set in the motor vehicle or selected for setting in the motor vehicle can be displayed via the display device 18.

The screen device 18 can have a touch-sensitive surface 22, by means of which a first user input from a vehicle occupant can be received via a contact. This touch-sensitive surface 22 may be configured to extend over the entire display area 20. In some examples, the first light signal provided by the screen device 18 can be adjusted based on the first user input received. In particular, based on the first user input, scrolling through menu that in particular offers a choice of a number of driving modes and/or a number of ambient modes can be displayed via the screen device 18. The display that can be output via the screen device 18 can be animated. The screen device 18 is set up to display information based on the situation. If a snow profile is to be displayed as a driving profile via the screen device 18, then a snow animation can be displayed via the display area 20. The display area 20 of the screen device 18 can be divided into several areas that are individually controllable.

The operating device 10 also includes a ring element 24. The operating device can be configured to receive a second user input characterized by an adjustment of the ring element 24 from the first rotary position to the second rotary position. This ring element 24 is arranged radially surrounding the display area 20. The ring element 24 is configured to be rotated about an axis of rotation 26 between respective different predetermined rotational positions. In the present case, the axis of rotation 26 coincides with a center axis of the ring element 24 and with a center point of the circular display area 20 of the screen device 18. In the present case, the ring element 24 is arranged so as to enclose the screen device 18 on the peripheral side. The ring element 24 can be rotated around the screen device 18 in order to adjust the ring element 24 between the respective rotational positions specified for the ring element 24. In this case, the screen device 18 can be fixed relative to the base element 16 in its movement about the axis of rotation 26, with the ring element 24 being rotatable about the axis of rotation 26 relative to the screen device 18 and the base element 16. In the present case, the ring element 24 can be arranged in twelve different rotational positions about the rotational axis 26, with the respective rotational positions each having the same angular distance to the adjacent rotational positions.

The rotational positions are thus evenly distributed around the circumference of the ring element 24 in this example. As a result, the respective rotary positions are offset from one another by 30 degrees. The ring element 24 is to be held in the respective rotational positions by means of a locking device, not shown in the figures, with a holding force predetermined by the locking device. As a result, the respective rotational position of the ring element 24 can be set precisely, and the risk of an unintentional adjustment of the ring element 24 can be kept particularly low. The locking device can have a mechanical detent, via which the respective rotational positions for the ring element 24 are preset. Alternatively or additionally, the ring element 24 can be held in the respective set rotational position via a magnetic field with the predetermined holding force. In order to be able to adjust the ring element 24 from a first rotational position to a second rotational position, the predetermined holding force holding the ring element 24 in the first rotational position must be overcome.

In this case, the adjustment of the ring element 24 from the first rotary position to the second rotary position can correspond to scrolling through a menu, wherein the scrolling through the menu can be displayed via the screen device 18. In this case, the menu can characterize a number of vehicle modes and/or a number of ambient modes from which the driving mode to be set and/or the ambient mode to be set can be selected.

The operating device 10 also includes a control device 28, which in the present case is represented by a box on the diagram. The control device 28 is configured to trigger the display of the driving mode and/or the ambient mode by the screen device 18. In this case, the control device 28 can control the screen device 18 in such a way that the screen device 18 displays the set driving mode or the driving mode selected based on the first user input and/or the second user input. Alternatively or additionally, the control device 28 can control the screen device 18 in such a way that the screen device 18 displays the ambient mode to be set that is set in the motor vehicle and/or selected based on the first user input and/or the second user input. Furthermore, the control device 28 is configured to receive the first user input from the screen device 18 and to receive the second user input from the ring element 24. Depending on the first user input received and/or the second user input received, the control device 28 can determine the selected driving mode to be set and/or the selected ambient mode to be set. Furthermore, the control device 28 is configured to provide a control signal for a computing device of the motor vehicle, the control signal characterizing the determined driving mode to be set in the motor vehicle and/or the determined ambient mode to be set in the motor vehicle. The control device 28 can thus trigger the setting of the selected driving mode and/or the setting of the selected ambient mode in the motor vehicle by providing the control signal.

In order to be able to display the displayed driving mode and/or the displayed ambient mode particularly well for a vehicle occupant by means of the operating device 10, the operating device 10 in the present case comprises a ring light element 30. This ring light element 30 is configured to provide a second light signal radially enclosing the ring element 24. The ring light element 30 can in particular be configured to output the second light signal in a color of the RGB color space. In the present case, the ring light element 30 is arranged on the base element 16. Furthermore, the attention of the vehicle occupant can be drawn to the ring element 24 by means of the ring light element 30, as a result of which a vehicle occupant can find the ring element 24 in the vehicle interior particularly easily. As a result, the risk of an accident involving the motor vehicle can be kept particularly low, since the vehicle occupant, in particular a driver of the motor vehicle, does not have to spend a lot of time searching for the operating device 10. Furthermore, the ring light element 30 can display the driving mode and/or the ambient mode via a color of the additional light signal that is output and/or a dynamic of the additional light signal that is output. In this case, the color of the additional light signal and/or the dynamic of the additional light signal can match a color or a dynamic of the display of the driving mode and/or the ambient mode output via the display device 18. As a result, the driving mode and/or ambient mode displayed by operating device 10 can be recognized particularly easily and quickly by a vehicle occupant, which means that particularly little attention is required for a driver to recognize the displayed driving mode and/or ambient mode, which means that the driver is able to direct their attention to the traffic situation in which they are driving. As a result, a particularly high level of road safety can be made possible.

The operating device 10 can furthermore have an aluminum ring 32, which is arranged to delimit the ring element 24 radially inwards and thus from the screen device 18. The ring element 24 can thus be visually delimited radially outwards by the ring light element 30 and radially inwards by the aluminum ring 32, as a result of which the vehicle occupant can find the ring element 24 particularly easily and quickly. In addition, the aluminum ring 32 can keep the risk of damage to the screen device 18 particularly low, in that the aluminum ring 32 prevents the ring element 24 from being in direct contact with the screen device 18. Instead, the aluminum ring 32 can be fixed relative to the display device 18, whereby the ring element 24 runs along the aluminum ring 32 when rotated about the axis of rotation 26. Here, the ring element 24 can slide along the aluminum ring 32.

In this example, the operating device 10 also includes a proximity sensor 34, which is represented by a box on the diagram. The proximity sensor 34 is configured to detect an approach of an object and/or a person before there is direct contact between the proximity sensor 34 and the object or the person. In particular, the proximity sensor 34 is configured to determine an approach of the object or the person to the operating device 10 without or before the object or the person coming into contact with the operating device 10. If the proximity sensor 34 is used to determine that the object and/or the person is approaching the operating device 10 closer than a predefined limit distance, then it is determined that a third user input has occurred. The proximity sensor 34 is thus configured to receive the third user input characterized by the approach to the proximity sensor 34 closer than the predetermined limit distance. The proximity sensor 34 can provide this determined third user input for the control device 28. Upon receiving the third user input, the control device 28 can trigger an adjustment of the display provided by the display device 18. This means that the control device 28 is configured to switch the screen device 18 to a standby mode when the third user input is received, with the switching of the screen device 18 to the standby mode being characterized by the adjustment of the display that is or can be output by the screen device 18. By putting the display device 18 on standby when the person or the object approaches the operating device 10 via the proximity sensor 34, the display of the driving mode and/or the ambient mode can be started or adjusted using the display device 18 and/or the display device 18 can be put on standby to receive the first user input via the touch-sensitive surface 22.

The screen device 18 and/or the ring element 24 can be configured to be relative to the base element 16 along the axis of rotation 26 and thus can be axially displaced, in particular pressed. As a result, a fourth user input characterized by a displacement of the screen device 18 and/or the ring element 24 along the axis of rotation 26 can be received by means of the operating device 10. This fourth user input can in particular characterize a confirmation of a selection made by the first user input and/or the second user input of the driving mode and/or the ambient mode. With a particularly simple structure, the operating device 10 is thus configured to receive a particularly large number of different user inputs.

The operating device 10 enables the installation of a dial with a display, in the present case the screen device 18, in an automotive context. At least the screen device 18 and/or the ring element 24 can be designed to be able to retract into the receptacle of the interior component 12 in order to keep the risk of injury to the vehicle occupants particularly low in the event of an accident for vehicle occupants in the event of a head impact on the operating device 10.

The operating device 10 enables the intuitive design of the motor vehicle for use by a driver. Furthermore, operating device 10 is configured to receive a macro command for a specific mood and to trigger an adjustment of emotional participants corresponding to the macro command in a single command, in this case via the control signal, instead of individually activating the motor vehicle components. The adjustment of the emotional participants, which are the components of the motor vehicle, are understood to be an adjustment in air conditioning and/or a seat back angle and/or seat heating and/or a freely programmable instrument cluster and/or a display control panel and/or a sound system and/or a playlist and/or an ambient light.

The operating device 10 is a driving experience switch. The operating device 10 comprises the base element 16 and the ring light element integrated in the base element 16 as static components, which are fixed relative to the interior component 12 in particular in the installation position of the operating device 10. Furthermore, the operating device 10 can have the screen device 18 with the touch-sensitive surface 22 as well as the aluminum ring 32 and the ring element 24 as components that can be pressed and thus displaced in the axial direction relative to the static components. The proximity sensor 34 may provide the touch-sensitive surface 22. The screen device 18 is circular in the present case and in particular can be used over its entire surface for the display, which is to be understood as meaning that a surface of the screen device 18 providing an entire outer surface of the operating device 10 facing the environment is provided by the display area 20.

LIST OF REFERENCE SIGNS 10 operating device
12 interior component
14 mounting arm
16 base element
18 screen device
20 display area
22 touch-sensitive surface
24 ring element
26 axis of rotation 28 control device
30 ring light element
32 aluminum ring
34 proximity sensor

The invention claimed is:

1. A dual-mode operating device for a motor vehicle, comprising:
 a base element configured to be attached to an interior component of the motor vehicle;
 a display device configured to display a driving mode and/or an ambient mode of the motor vehicle, the display device comprising a touch-sensitive surface for receiving a display device user input;
 a ring element configured to circumferentially enclose the display device on a peripheral side, the ring element being rotatable to different positions relative to the base element, and configured to receive a ring element user input,
  wherein the display device user input is configured to select either the driving mode or the ambient mode, and the ring element user input is configured to select an option from a menu related to the mode selected by the display device user input; or
  wherein the ring element user input is configured to select either the driving mode or the ambient mode, and the display device user input is configured to select an option from a menu related to the mode selected by the ring element user input; and
 a control device configured to provide a control signal based on the display device user input and the ring element user input, the control signal setting the selected driving mode and/or ambient mode of the motor vehicle.

2. The dual-mode operating device according to claim 1, wherein the control device is configured to trigger a display of the set driving mode or a driving mode selected for setting, depending on the display device user input and/or the ring element user input via the display device.

3. The dual-mode operating device according to claim 1, wherein the control device is configured to trigger a display of the set ambient mode and/or display of an ambient mode selected for setting, based on the display device user input and/or the ring element user input via the display device.

4. The dual-mode operating device according to claim 1, further comprising a proximity sensor configured to receive a third user input characterized by an approach to the proximity sensor, wherein the control device is configured to, upon receiving the third user input, place the display device in a standby mode.

5. The dual-mode operating device according to claim 1, further comprising a locking device configured to hold the ring element mechanically or electromagnetically in the respective rotational positions.

6. The dual-mode operating device according to claim 5, wherein the ring element is configured to be locked in respective rotational positions offset by 30 degrees with respect to one another.

7. The dual-mode operating device according to claim 1, further comprising a ring light element configured to emit a light signal enclosing the ring element.

8. The dual-mode operating device according to claim 1, wherein the display device is radially enclosed by an aluminum ring that is fixed to the display device and is radially surrounded by the ring element.

9. The dual-mode operating device according to claim 1, wherein the display device and/or the ring element are configured to be axially displaceable relative to the base element for actuation.

10. A motor vehicle, comprising:
 a dual-mode operating device configured within the motor vehicle, the operating device comprising:
  a base element configured to be attached to an interior component of the motor vehicle;
  a display device configured to display a driving mode and/or an ambient mode of the motor vehicle, the display device comprising a touch-sensitive surface for receiving a display device user input;
  a ring element configured to circumferentially enclose the display device on a peripheral side, the ring element being rotatable to different positions relative to the base element, and configured to receive a ring element user input,
   wherein the display device user input is configured to select either the driving mode or the ambient mode, and the ring element user input is configured to select an option from a menu related to the mode selected by the display device user input; or
   wherein the ring element user input is configured to select either the driving mode or the ambient mode, and the display device user input is configured to select an option from a menu related to the mode selected by the ring element user input; and
  a control device configured to provide a control signal based on the display device user input and the ring element user input, the control signal setting the selected driving mode and/or ambient mode of the motor vehicle.

11. The motor vehicle according to claim 10, wherein the control device is configured to trigger a display of the set driving mode or a driving mode selected for setting, depending on the display device user input and/or the ring element user input via the display device.

12. The motor vehicle according to claim 10, wherein the control device is configured to trigger a display of the set ambient mode and/or display of an ambient mode selected for setting, based on the display device user input and/or the ring element user input via the display device.

13. The motor vehicle according to claim 10, further comprising a proximity sensor configured to receive a third user input characterized by an approach to the proximity sensor, wherein the control device is configured to, upon receiving the third user input, place the display device in a standby mode.

14. The motor vehicle according to claim 10, further comprising a locking device configured to hold the ring element mechanically or electromagnetically in the respective rotational positions.

15. The motor vehicle according to claim 14, wherein the ring element is configured to be locked in respective rotational positions offset by 30 degrees with respect to one another.

16. The motor vehicle according to claim 10, further comprising a ring light element configured to emit a light signal enclosing the ring element.

17. The motor vehicle according to claim 10, wherein the display device is radially enclosed by an aluminum ring that is fixed to the display device and is radially surrounded by the ring element.

18. The motor vehicle according to claim 10, wherein the display device and/or the ring element are configured to be axially displaceable relative to the base element for actuation.

19. A method for operating a dual-mode operating device for a motor vehicle, comprising:
- displaying, via a display device, a driving mode and/or an ambient mode of the motor vehicle;
- receiving a display device user input on a touch-sensitive surface of the display device to select either the driving mode or the ambient mode;
- (i) receiving a ring element user input by adjusting a rotational position of a ring element configured to enclose the display device on a peripheral side and be arranged in different rotational positions relative to a base element, the ring element user input selecting an option from a menu related to the mode selected by the display device user input; or
- (ii) receiving a ring element user input by adjusting a rotational position of the ring element to select either the driving mode or the ambient mode, and receiving a display device user input on the touch-sensitive surface of the display device to select an option from a menu related to the mode selected by the ring element user input; and
- providing, via a control device, a control signal based on the display device user input and the ring element user input, the control signal setting the selected driving mode and/or ambient mode of the motor vehicle.

20. The method according to claim 19, further comprising:
- receiving a third user input characterized by an approach to a proximity sensor; and
- placing the display device in a standby mode upon receiving the third user input via the control device.

* * * * *